US012710886B2

(12) United States Patent
Milojicic et al.

(10) Patent No.: US 12,710,886 B2
(45) Date of Patent: Aug. 18, 2026

(54) FEDERATED MANAGEMENT OF DATA OPERATORS ON NEAR-MEMORY COMPUTE NODES

(71) Applicant: Hewlett Packard Enterprise Development LP, Spring, TX (US)

(72) Inventors: Dejan S. Milojicic, Palo Alto, CA (US); Kirk M. Bresniker, Granite Bay, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/317,608

(22) Filed: May 15, 2023

(65) Prior Publication Data

US 2024/0385759 A1 Nov. 21, 2024

(51) Int. Cl.
*G06F 3/06* (2006.01)

(52) U.S. Cl.
CPC .......... *G06F 3/0631* (2013.01); *G06F 3/0622* (2013.01); *G06F 3/067* (2013.01)

(58) Field of Classification Search
None
See application file for complete search history.

(56) References Cited

U.S. PATENT DOCUMENTS 10,185,499 B1 * 1/2019 Wang .................... G06F 3/0611
12,236,240 B2 2/2025 Milojicic et al.
2010/0094981 A1 * 4/2010 Cordray .............. H04L 63/0227 709/224
2015/0358425 A1 12/2015 Vennelakanti et al.
2018/0024932 A1 * 1/2018 Nachimuthu ......... H04L 41/145
2018/0024935 A1 * 1/2018 Meswani ............ G06F 12/0893 711/145
2018/0165209 A1 * 6/2018 Poxon ................... G06F 12/023
2021/0349837 A1 * 11/2021 Huangfu .............. G06F 9/5016
(Continued)

OTHER PUBLICATIONS

Amazon Web Services, Inc., "Amazon Redshift," Database Developer Guide, Aug. 27, 2021, 1658 pages.
(Continued)

*Primary Examiner* — Hosain T Alam
*Assistant Examiner* — Ryan Dare
(74) *Attorney, Agent, or Firm* — Slater Matsil, LLP

(57) ABSTRACT

Examples described herein relate to federated management of data operators across multiple near-memory compute (NMC) nodes attached to memory devices in a network-attached memory system. Federated management includes loading, executing, and scaling data operators across the multiple NMC nodes together as a group. Examples include receiving a data access request from a client application and loading data operators in the multiple NMC nodes based on a data access pattern associated with the data access request. Examples include scaling the data operators based on performance metrics for the data operators or the multiple NMC nodes in correlation with client application performance. The multiple NMC nodes may dynamically scale the data operators based on request-load, execution frequency of data operators, resource availability, or other scaling strategies. Examples also include loading and scaling the data operators based on one or more of request characteristics or data operator characteristics.

20 Claims, 6 Drawing Sheets

(56) References Cited

U.S. PATENT DOCUMENTS

| | | | | |
|---|---|---|---|---|
| 2022/0107867 | A1* | 4/2022 | Wu | G06F 11/1068 |
| 2023/0244496 | A1* | 8/2023 | Agrawal | G06F 9/30189 712/7 |
| 2024/0111993 | A1 | 4/2024 | Korolija et al. | |
| 2024/0168639 | A1* | 5/2024 | Aga | G06F 3/0673 |
| 2024/0201990 | A1* | 6/2024 | Aga | G06F 9/30036 |

OTHER PUBLICATIONS

Diaz-Montes, J. et al., "Exploring the Use of Elastic Resource Federations for Enabling Large-scale Scientific Workflows," Sep. 13, 2013, 6 pages.
Konstanteli, K. et al., "Elastic Admission Control for Federated Cloud Services," Dec. 5, 2014, 14 pages.
Rafique, A. et al., "SCOPE: Self-adaptive and Policy-based Data Management Middleware for Federated Clouds," Jan. 30, 2019, 19 pages,.
Korolija et al, "Farview: Disaggregated Memory with Operator Offloading for Database Engines", (CIDR '22). January 10-13, 2022, 14 pages.

* cited by examiner

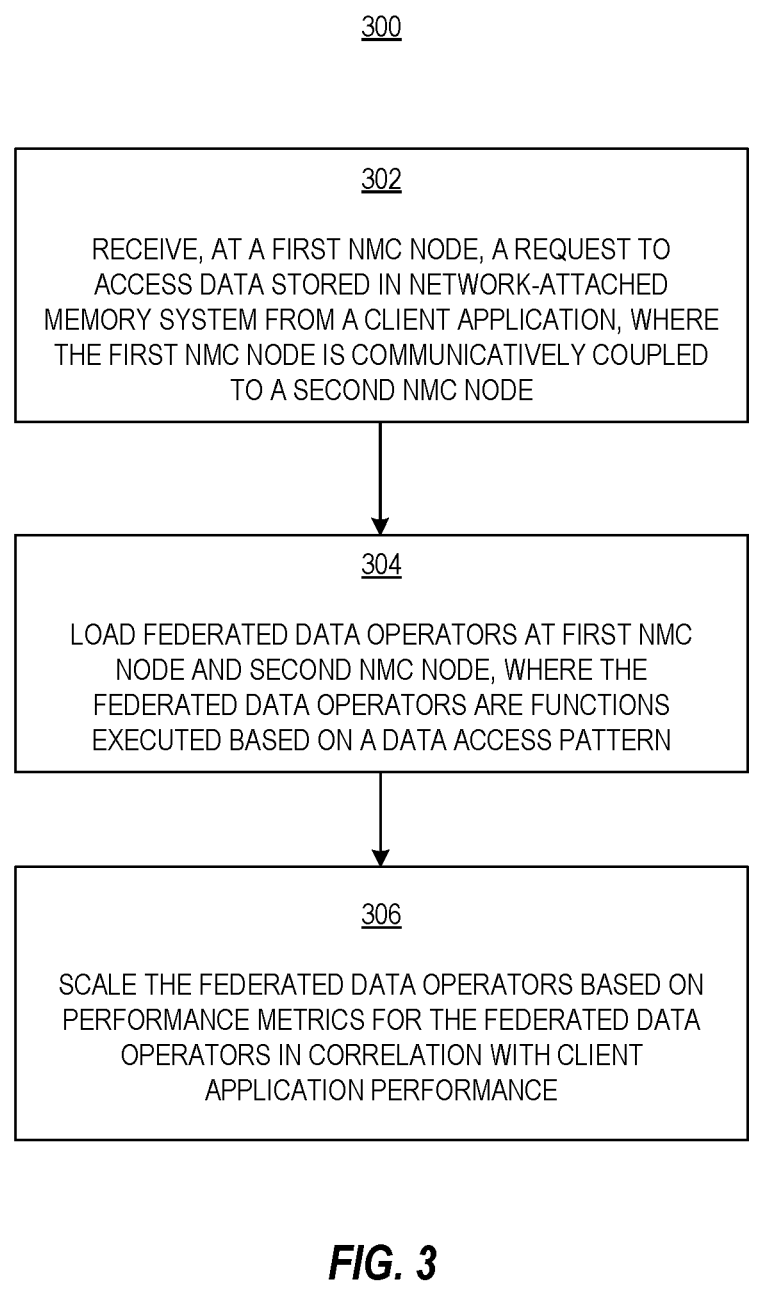

300

302

RECEIVE, AT A FIRST NMC NODE, A REQUEST TO ACCESS DATA STORED IN NETWORK-ATTACHED MEMORY SYSTEM FROM A CLIENT APPLICATION, WHERE THE FIRST NMC NODE IS COMMUNICATIVELY COUPLED TO A SECOND NMC NODE

304

LOAD FEDERATED DATA OPERATORS AT FIRST NMC NODE AND SECOND NMC NODE, WHERE THE FEDERATED DATA OPERATORS ARE FUNCTIONS EXECUTED BASED ON A DATA ACCESS PATTERN

306

SCALE THE FEDERATED DATA OPERATORS BASED ON PERFORMANCE METRICS FOR THE FEDERATED DATA OPERATORS IN CORRELATION WITH CLIENT APPLICATION PERFORMANCE

*FIG. 3*

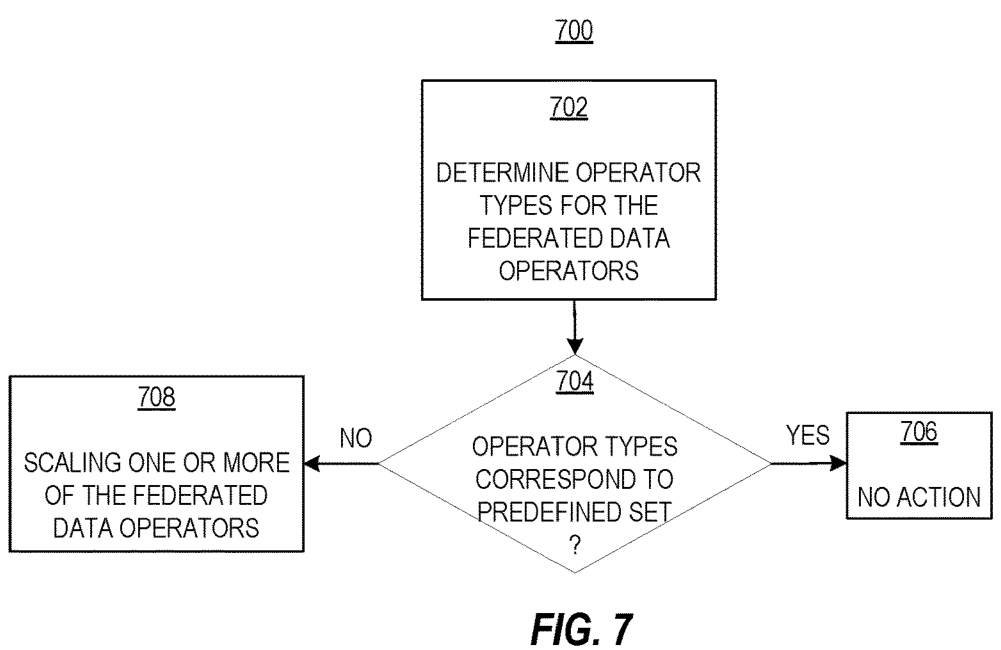

*FIG. 7*

COMPUTING DEVICE 800

PROCESSING RESOURCE 802

MACHINE-READABLE STORAGE MEDIUM 804

806

RECEIVE, AT A FIRST NMC NODE, A REQUEST TO ACCESS DATA STORED IN THE NETWORK-ATTACHED MEMORY SYSTEM FROM A CLIENT APPLICATION, WHERE THE FIRST NMC NODE IS COMMUNICATIVELY COUPLED TO A SECOND NMC NODE

808

LOAD FEDERATED DATA OPERATORS, AT FIRST AND SECOND NMC NODES BASED ON ONE OR MORE OF REQUEST CHARACTERISTICS OR OPERATOR CHARACTERISTICS, WHERE THE FEDERATED DATA OPERATORS ARE FUNCTIONS MANAGED TOGETHER IN A FEDERATED MANNER

810

SCALE THE FEDERATED DATA OPERATORS BASED ON PERFORMANCE METRICS FOR THE FEDERATED DATA OPERATORS IN CORRELATION WITH CLIENT APPLICATION PERFORMANCE

*FIG. 8*

FEDERATED MANAGEMENT OF DATA OPERATORS ON NEAR-MEMORY COMPUTE NODES

BACKGROUND

A network-attached memory system is a disaggregated memory system that is distinct from the memory in computing devices (e.g., servers). These systems include a plurality of memory devices that serve as a pool of storage that can be allocated to and remotely accessed by any computing device on a network. The disaggregation decouples memory from computing devices and enables applications to access both local and remote memories. Disaggregation may involve separating computation components and storage and/or separating memory and compute. The separation of memory and compute can occur through disaggregated dynamic random access memory (DRAM), disaggregating persistent memory, far memory, and smart remote memory.

Computing devices may access data stored in a local memory significantly faster than data that is stored in a network-attached memory system. Typically, data access from local memory may be approximately 1-2 orders of magnitude faster when compared to data access from the network-attached memory system. As a result, frequent access to the network-attached memory system can lead to significant delay in processing requests, such as arithmetic operations on data, from client applications hosted on the computing devices.

To reduce the delay, a small amount of processing capability can be introduced in proximity to the memory devices in the network-attached memory system. For example, memory-side accelerators or near-memory compute (NMC) nodes may be added or attached to the memory devices in the network-attached memory systems. Such NMC nodes may execute data operators, which are functions that perform operations on the data close to the memory devices. These data operators accelerate data transfer between network-attached memory system and computing devices, reduce the burden of requesting clients, and improve overall infrastructure efficiency.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 3 is a flowchart illustrating an example method to scale federated data operators across NMC nodes;

FIG. 7 is a flowchart illustrating another example method to scale federated data operators based on operator types; and FIG. 8 is a block diagram illustrating an example computing device to scale federated data operators.

Figure 1:
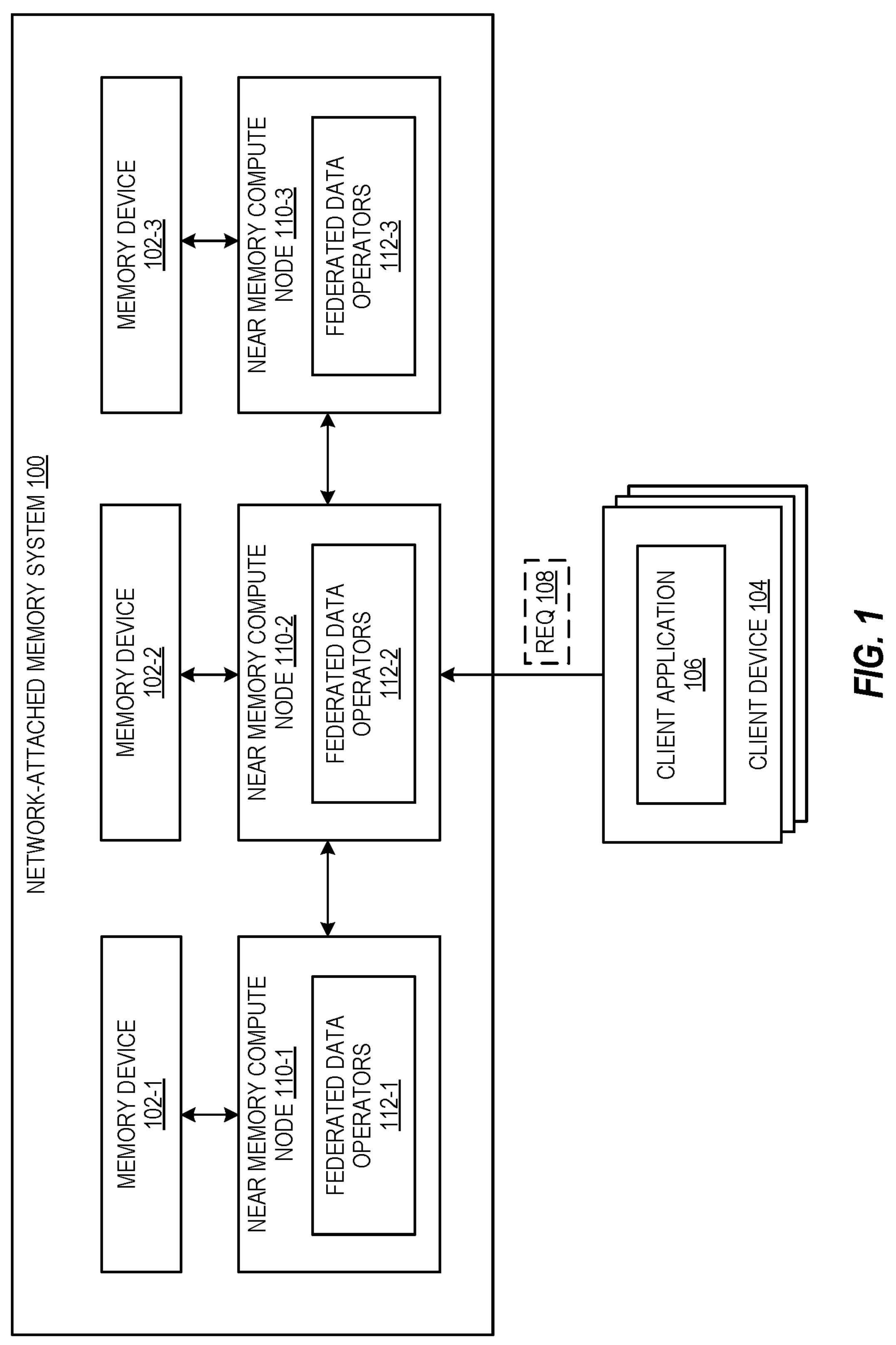
FIG. 1 is an illustration of an example network-attached memory system with multiple near-memory compute (NMC) nodes providing federated data operator management.

Certain examples have features that are in addition to or in lieu of the features illustrated in the above-referenced figures. Certain labels may be omitted from certain figures for the sake of clarity.

DETAILED DESCRIPTION

Data operators are functions offloaded to near memory compute (NMC) nodes, which are coupled to memory devices in a network-attached memory system. The functions improve performance on memory operations, such as addressing (e.g., pointer chasing, hashing), computation on data (e.g., compression, encryption, etc.), data filtering (e.g., projections and views of data), etc., and reduce multiple traversals of data requests from client applications over interconnects between the network-attached memory system and computing devices.

Generally, the NMC nodes include limited resources (processing, memory, etc.) to execute data operators. Each data operator at an NMC node may have a threshold (e.g., an upper limit) on the amount of resources available for use. Therefore, a relatively small number of data operators are loaded and executed at an NMC node at any given instance. To accommodate different types of data operators that perform different memory operations, an NMC node may manage the limited number of data operators and NMC node resources by scaling and/or swapping data operators. Scaling data operators may include increasing or decreasing the number of data operators at a particular NMC node, or increasing or decreasing the amount of resources allocated to the data operators. Swapping a data operator at an NMC node may include unloading the data operator and loading another data operator at the NMC node.

However, existing solutions manage data operators at a single NMC node without considering management of data operators offloaded at other NMC nodes (e.g., peer NMC nodes attached to other memory devices in the network-attached memory system). As data operators are managed on each NMC node independently (i.e., on a per-NMC node basis), the resources at the NMC nodes are not effectively utilized across the network-attached memory system. In particular, when NMC nodes receive a large number of requests from client applications, the existing solutions of scaling data operators at respective NMC nodes in an independent manner may lead to significant delay. Such mismanagement may cause degradation of performance of client applications and poor utilization of NMC node resources.

In examples consistent with this disclosure, federated management of data operators across distributed NMC nodes in network-attached memory systems is provided to effectively utilize NMC node resources and improve client application performance. Federated management of data operators include loading, scaling, or execution of the data operators together as a group instead of managing the data operators independently and in isolation at each NMC node.

Examples described herein include NMC nodes attached to respective memory devices of a network-attached memory system. An NMC node receives a request to access data stored in a memory device and loads relevant data operators, which perform specific functions on the data, to accelerate the data access. Examples also describe scaling (e.g., increasing or decreasing) the data operators or resources allocated to the data operators across the NMC nodes in a federated manner.

Some examples include loading and executing the data operators in the distributed NMC nodes in a federated manner based on data access patterns of requests from client applications. For example, if the data access pattern is a parallel access pattern, then identical data operators are loaded and executed in multiple NMC nodes simultaneously. Alternatively, if the data access pattern is a dataflow pattern, then different sets of data operators are loaded and executed in different NMC nodes according to the dataflow pattern. When requests involve both parallel and dataflow patterns, examples may initially load and execute identical data operators on multiple NMC nodes and subsequently load and execute different sets of data operators in different NMC nodes to process the requests. By loading and executing federated data operators across multiple NMC nodes according to the data access patterns in this manner, examples avoid or reduce iterative traversals of data requests between client applications and NMC nodes.

Examples also include loading data operators at an NMC node based on data operator types. In some examples, data operator types may include compute-heavy operator type, memory-heavy operator type, or the like. Examples may load data operators having operator types that are associated with complementary resource consumption behaviors. For example, an NMC node may load a combination of compute-heavy data operators and memory-heavy data operators instead of exclusively loading either compute-heavy data operators or memory-heavy data operators. In this manner, examples may reduce or avoid over-consumption of a particular resource type, i.e., either compute or memory resources, at the NMC node and achieve a balanced and equitable utilization of resources at each NMC node.

Examples described herein also include various scaling strategies to meet demands of the large volume of data requests and to optimally use NMC node resources. Scaling may include increasing or decreasing data operators (i.e., scaling-out or scaling-in) or increasing or decreasing NMC node resources allocated to that data operator (i.e., scaling-up or scaling-down). Some example scaling strategies include scaling-up or scaling-out a data operator at one or more NMC nodes that processes a large number of requests from client applications. Some examples include composing multiple data operators, such as a compression data operator, encryption data operator, etc., into a single data operator, which can perform multiple functions. Other examples include distributing data operators between an NMC node and a client device requesting data access to balance resources consumed at the NMC nodes and the client devices. For example, encryption operators may be loaded at the client device and compression operators may be offloaded to the NMC node. By increasing the number of data operators or resources allocated to data operators in this manner, examples may accelerate data access and process the requests from client applications more efficiently.

Examples also include applying different federated scaling policies to scale data operators across multiple NMC nodes together. In some examples, a conservative scaling policy may be implemented to scale a particular data operator across each node only when request-load on that data operator increases. In some examples, an aggressive scaling policy may be used for scaling-out (or scaling-in) across NMC nodes. For example, if a particular data operator is scaled-out (or scaled-in) at one NMC node, then the same data operators at other NMC nodes are also scaled-out (or scaled-in). In some examples, a load-proportional scaling policy may be implemented to increase or decrease the number of data operators at each NMC node with an increase or decrease in the volume of requests from client applications. In some examples, operator-weight scaling policy may be implemented to assign a weightage or rank to data operators based on how frequently a particular data operator is executed relative to other data operators at an NMC node. Such a policy may increase the data operator with highest weightage or rank at the NMC node.

Examples described herein also include measuring performance of data operators and NMC nodes in correlation with client application performance. Some examples include determining performance metrics for individual data operators or a collection of data operators at NMC nodes. Examples of performance metrics may include data transfer savings, latency reduction, bandwidth increase, energy savings, etc. The performance metrics are correlated with quality of service (QOS) metrics, such as throughput, for the client application. If the performance metrics for a particular data operator has low correlation with QoS metrics for the client application, then examples may decrease the number of that data operator at the NMC node, for example. Alternatively, if the performance metrics for a data operator has high correlation with QoS metrics for the client application, then examples may increase the number of data operators at the NMC node. By scaling the data operators based on the correlation of performance metrics for data operators with application performance in this manner, examples improve resource consumption at the NMC nodes without compromising the client application performance.

Examples of this disclosure provide efficient access to data stored in disaggregated memory systems. The technical improvements are achieved in near memory compute nodes, client applications and devices, and network attached memory systems. For instance, the automated management of data operators in a federated manner allow faster processing of data requests from client applications without exceeding network resource consumption (e.g., bandwidth) and overloading of data requests at NMC nodes. Additionally, the example scaling policies allow balanced utilization of processing, memory, and network resources at the NMC nodes. Examples ensure that federated management of data operators allow improved performance of the client application and devices.

FIG. 1 is an illustration of an example network-attached memory system facilitating federated management of data operators on multiple near-memory compute (NMC) nodes.

A network-attached memory system 100 includes a plurality of memory devices 102-1, 102-2, 102-3 and so on. The network-attached memory system 100 serves as a disaggregated memory or storage that is remotely accessible by clients, such as computing devices (e.g., compute servers), workloads (e.g., client applications executing on the computing devices), or the like. Each memory device in the network-attached memory system 100 may be a storage device (e.g., a memory server or a memory array) including a plurality of memory components that store data. The memory devices (as part of the network-attached memory system) provide a pool of memory for client devices for data storage.

A client device, such as a client device 104, may access the data stored in the memory devices 102-1, 102-2, 102-3 over network interconnects, such as load-store interfaces.

The client device 104 may host applications, such as a client application 106, which access the data stored in the memory devices 102-1, 102-2, 102-3. For example, the client applications 106 may send requests 108 (labeled as "REQ 108"), such as arithmetic requests, to the network-attached memory system 100 to access or store data in the memory devices 102-1, 102-2, 102-3.

The memory devices 102-1, 102-2, 102-3 may include or be coupled to NMC nodes 110-1, 110-2, 110-3, respectively. The NMC nodes 110-1, 110-2, 110-3 may be accelerators that include a relatively small amount of compute capabilities for offloading data processing operations in close proximity to the memory devices 102-1, 102-2, 102-3 in the network-attached memory system 100. The NMC nodes 110-1, 110-2, 110-3 can execute data operators, which are functions performing some processing of data stored in the memory devices 102-1, 102-2, 102-3. The NMC nodes may receive requests from the client applications to perform arithmetic operations at the memory devices. The NMC nodes may load data operators related to the requested data and execute the data operators to perform certain operations on the requested data to accelerate data access and improve client application performance.

The NMC nodes 110-1, 110-2, 110-3 manage data operators in a federated manner. As used herein, "federated" or "federated manner" refers to performing management, such as loading, scaling, or executing, or other actions, of data operators together in a group across multiple NMC nodes, each coupled to a respective memory device of the network-attached memory system. These data operators are also referred to herein as "federated data operators" 112-1, 112-2, 112-3. The federated data operators may perform various operations, such as data addressing (e.g., pointer chasing, hashing), data filtering (e.g., projections and views), and data computation (e.g., compression, encryption, etc.) in some coherent pattern across the multiple NMC nodes 110-1, 110-2, 110-3.

In some examples, the NMC nodes 110-1, 110-2, 110-3 may receive requests, such as request 108, to access data stored in the memory devices 102-1, 102-2, 102-3. The NMC nodes 110-1, 110-2, 110-3 may load federated data operators 112-1, 112-2, 112-3, which perform operations on the requested data. In some examples, the NMC nodes 110-1, 110-2, 110-3 may load the federated data operators based on data access pattern, which may refer to a sequence of read operations performed at memory addresses of one or more memory devices. In other examples, the NMC nodes 110-1, 110-2, 110-3 may load the federated data operators based on one or more of request characteristics of the request (e.g., request-load, a type of applications, or a type of data requested) or operator characteristics of the federated data operators (data operator availability or particular data operator(s) specified in the request). Further, the NMC nodes 110-1, 110-2, 110-3 may scale the federated data operators based on performance of client application and the performance metrics of the federated data operators. Various examples of management of federated data operators are described further in detail in relation to FIG. 2-FIG. 8.

Figure 2:
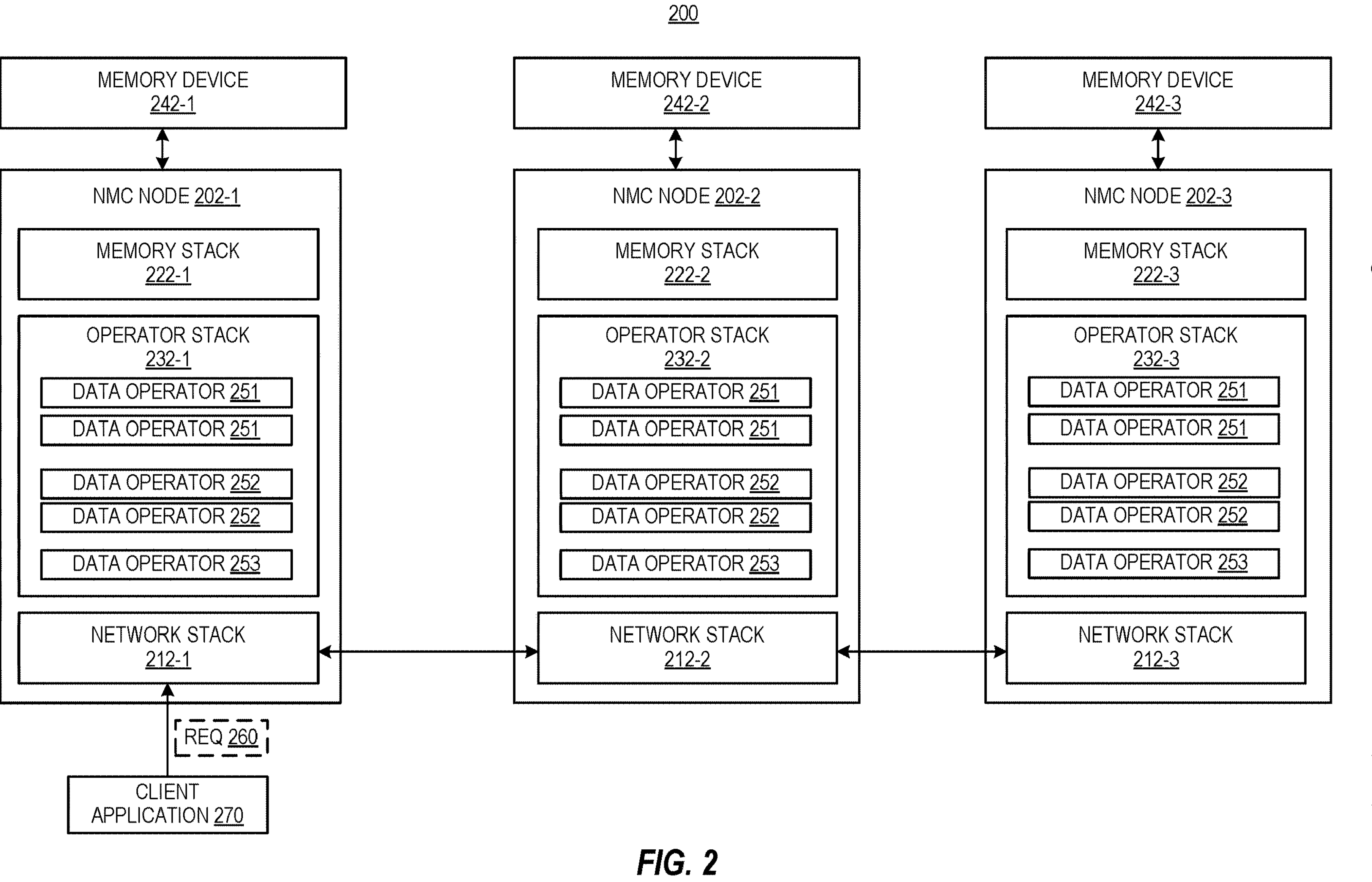
FIG. 2 is an illustration of example NMC node components that facilitate federated data operator management.

FIG. 2 is an illustration of example near-memory compute (NMC) nodes that manage data operators in a federated manner across the NMC nodes.

NMC nodes 202-1, 202-2, 202-3 are distributed across a network-attached memory system. Each of the NMC nodes 202-1, 202-2, 202-3 is coupled to a respective memory device 242-1, 242-2, 242-3. Each NMC node includes a respective network stack, a respective memory stack, and a respective operator stack. As shown, NMC node 202-1 includes network stack 212-1, memory stack 222-1, and operator stack 232-1; NMC node 202-2 includes network stack 212-2, memory stack 222-2, and operator stack 232-2; NMC node 202-3 includes network stack 212-3, memory stack 222-3, and operator stack 232-3.

Each network stack 212-1, 212-2, 212-3 may include a respective remote direct memory access (RDMA) connection protocol to manage all external connections, such as connections to client devices, storage nodes, other NMC nodes, or other devices. One or more client devices can flow and associate with one or more dynamic regions (not shown in FIG. 2) in the operator stack via the network stack. The dynamic regions represent a collection of vertical stacks (e.g., in operator stack, network stack, and memory stack) allocated to a particular client application or user. In the operator stacks, the dynamic regions contain data operators, such as data operators 251, 252, 253, which perform near memory processing for the offloading of operations. In FIG. 2, network stack 212-1 receives a request 260 (labeled as "REQ 260") from a client application 270 and forward it to the operator stack 232-1 and appropriate dynamic region. Each client connection can be associated with a specific queue pair number (e.g., of the form <integer, integer>) which can be used to propagate the request to the correct dynamic region to which the client is assigned. Once in the correct dynamic region, the request can be forwarded to memory stack 222-1, described further below. Data corresponding to the request can be read from memory stack 222-1 and passed to the same dynamic region in operator stack 232-1, where the operators are executed. Resulting data may be sent back to network stack 212-1 and provided to the client application 270.

Memory stack 222-1, 222-2, 222-3 can manage all memory allocations, address translations, and concurrent accesses from dynamic regions of the operator stack 232-1, 232-2, 232-3. This stack may include a memory management unit (not shown in FIG. 2) to translate addresses to the memory. Memory stack 222-1, 222-2, 222-3 may include multiple channels to facilitate multiple concurrent requests. For example, a DRAM channel (not shown in FIG. 2) may route to direct memory access to access memory management unit. Memory may be allocated to each channel in a striped pattern to optimize the available bandwidth. The operator stack 232-1, 232-2, 232-3 may interface with respective memory stack 222-1, 222-2, 222-3 to receive data from the memory devices 242-1, 242-2, 242-3. In some examples, the memory stack 222-1, 222-2, 222-3 may directly communicate with the network stack 212-1, 212-2, 212-3 and bypass the respective operator stack 232-1, 232-2, 232-3 (e.g., if data operators are not available in the operator stack).

Each of the operator stacks 222-1, 222-2, 222-3 may be split into multiple isolated dynamic regions that operate concurrently. Dynamic regions in operator stack 222-1, 222-2, 222-3 can process the data for multiple clients at the same time. Each dynamic region can contain a set of operators to process a range of requests. The operator stacks 222-1, 222-2, 222-3 may include one or more data operators 251, 252, 253, each of which may perform different operations on the requested data. For example, data operators 251 may perform encryption, data operators 252 may perform compression, data operator 253 may perform hashing, or the like. Although a certain number of data operators is depicted, the operator stacks 222-1, 222-2, 222-3 may load a different number or combination of data operators. The operator stacks 222-1, 222-2, 222-3 may include a combination of programmable space and a fixed function unit. The programmable space may be used for instantiating different data operators when needed to perform operations (e.g., in response to requests), while the fixed function unit may include particular data operators that are pre-loaded in operator stacks 222-1, 222-2, 222-3.

Examples of scaling federated data operators are described herein in relation to FIG. 2 and FIG. 3. FIG. 3 is a flowchart illustrating an example method 300 to scale federated data operators across NMC nodes, such as NMC nodes 202-1, 202-2, 202-3 of FIG. 2. NMC node 202-1 may be referred to as first NMC node, NMC node 202-2 may be referred to second NMC node, and NMC node 202-3 may be referred to as third NMC node.

At block 302, method 300 includes receiving, at an NMC node, a request to access data stored in memory device(s) of a network-attached memory system from a client application. For example, the first NMC node 202-1 receives the request 260 from the client application 270 to access data stored in the one or more memory devices 242-1, 242-2, 242-3. The first NMC node 202-1 is communicatively coupled to multiple NMC nodes of the network-attached memory system and can communicate with the second NMC node 202-2 and the third NMC node 202-3 (e.g., via load-store interfaces).

At block 304, method 300 includes loading federated data operators at the NMC nodes based on data access patterns associated with requests from client applications. For example, method 300 includes loading and executing the data operators 251, 252, 253 at the first, second, and third NMC nodes 202-1, 202-2, 202-3 based on data access pattern associated with the request 260 from the client application 270. Data access pattern refers to a sequence of read operations performed at memory addresses of one or more memory devices. Examples of data access patterns may be a parallel access pattern, a dataflow pattern, or a predefined access pattern. Parallel access pattern may refer to a pattern of accessing data from multiple memory devices simultaneously. For example, a client application 270 may send a request 260 to simultaneously access data stored in memory devices 242-1, 242-2, 242-3. Dataflow pattern may refer to a pattern of accessing data from multiple memory devices in a particular sequence. For example, a client application 270 may send a request 260 to access data in a particular sequence, which may include first accessing data from memory device 242-1 before accessing data from memory device 242-2, and so on. Predefined access pattern may refer to a an arbitrary pattern of accessing data from memory devices. The arbitrary pattern may include a combination of both parallel and dataflow patterns, for example. Loading federated data operators according to such data access patterns is described further in relation to FIG. 4.

At block 306, method 300 includes scaling the federated data operators based on performance metrics for one or more of the federated data operators in correlation with client application performance. For example, method 300 includes determining performance metrics for each data operator at each NMC node and determining application performance metrics for client application sending data requests. Examples of the performance metrics associated with the federated data operators may include one or more of data transfer, latency, bandwidth, energy, etc. The client application performance may be quantified based on quality of service (QOS) metrics associated with the client application. Examples of the QoS metrics may include throughput, availability, packet loss, or the like.

In some examples, the federated data operators may be scaled based on performance metrics for an individual data operator at one or more NMC nodes. For example, the first NMC node 202-1 may determine values for the performance metrics for the data operator 251. In particular, the first NMC node 202-1 may determine data transfer savings, reduction in latency, increase in bandwidth, or energy savings associated with requests from client applications the usage of the data operator 251. The first NMC node 202-1 may correlate the determined values with the with client application QoS metrics, such as throughput. Values for the QoS metrics may be determined based on request metadata or may be received periodically from the client application, for example.

The first NMC node 202-1 may scale the data operator by varying data operator count or varying resource allocation to that data operator. "Data operator count" (also referred to as "count") of a data operator refers to a quantity of the data operator deployed at an NMC node. For example, at NMC node 202-1, the count of data operator 251 is 2, the count of data operator 252 is 2, and the count of data operator 253 is 1. In some examples, scaling the federated data operators may include a scale-out (or scale-in) operation or a scale-up (or scale-down) operation. Scale-out operation may include increasing the count of a particular data operator at one or more NMC nodes and scale-in operation may include decreasing the count of a particular data operator at one or more NMC nodes. Scale-up operation may include increasing resources, such as processing, memory, network resources, allocated to a particular data operator at one or more NMC nodes. Scale-down operation may include decreasing such resources allocated to a particular federated data operator at one or more NMC nodes.

In some examples, method 300 includes scaling-out or scaling-up a data operator if the performance metrics for the data operator and the client application performance have high correlation. For example, the performance metrics for the data operator 251 may include high data transfer savings, large latency reduction, or high energy savings. Client application performance may include satisfactory client application QoS (e.g., high throughput). In such examples, the performance metrics for the data operator and the client application performance may be said to have high correlation. Accordingly, method 300 may scale-out or scale-up the data operators 251. Scaling-out the data operator 251 at the first NMC node 202-1 may include increasing the count of data operator 251. After the scale-out operation, the first NMC node 202-1 may include more than two data operators 251. Alternatively, scaling-up the data operator 251 may include increasing resources allocated to the data operator 251.

In some examples, method 300 includes scaling-in or scaling-down a data operator if the performance metrics for the data operator and the client application performance have low correlation. For example, the performance metrics for the data operator 251 may include high data transfer savings, large latency reduction, or high energy savings. Client application performance may be unsatisfactory client application QoS (e.g., low throughput). In such examples, the performance metrics for the data operator and the client application performance may be said to have low correlation. Accordingly, method 300 may scale-in or scale-down the data operator 251. Scaling-in the data operator 251 at the first NMC node 202-1 may include decreasing the count of data operator 251. After the scale-in operation, the first NMC node 202-1 may include less than two data operators 251. Alternatively, scaling-down the data operator 251 may include decreasing resources allocated to the data operator 251.

In some examples, method 300 includes scaling-out or scaling-in the federated data operators based on aggregate performance metrics for all the federated data operators at the NMC node. In other examples, the federated data operators may be scaled based on performance metrics for an individual NMC node, such as one of the first, the second, or the third NMC node. Alternatively, method 300 includes scaling the federated operators based on aggregate performance metrics of all the NMC nodes together.

In some examples, method 300 includes applying scaling policies to scale data operators to optimize the amount of resources, such as processing, memory, and/or network resources, consumed at the NMC nodes. For example, a scaling policy to balance resource consumption between NMC node and client device can be applied to reduce resource consumption at the NMC nodes. When such a policy is applied, some data operators may be unloaded (e.g., scaled-in) at the first NMC node 202-1 and loaded (and scaled out) in the client device hosting the client application 270. Alternatively, another scaling policy may be applied to combine or compose multiple data operators into a single data operator, which performs multiple functions. For example, a first data operator performing compression and a second data operator performing encryption may be combined into a third data operator that performs compression and encryption.

Figure 4:
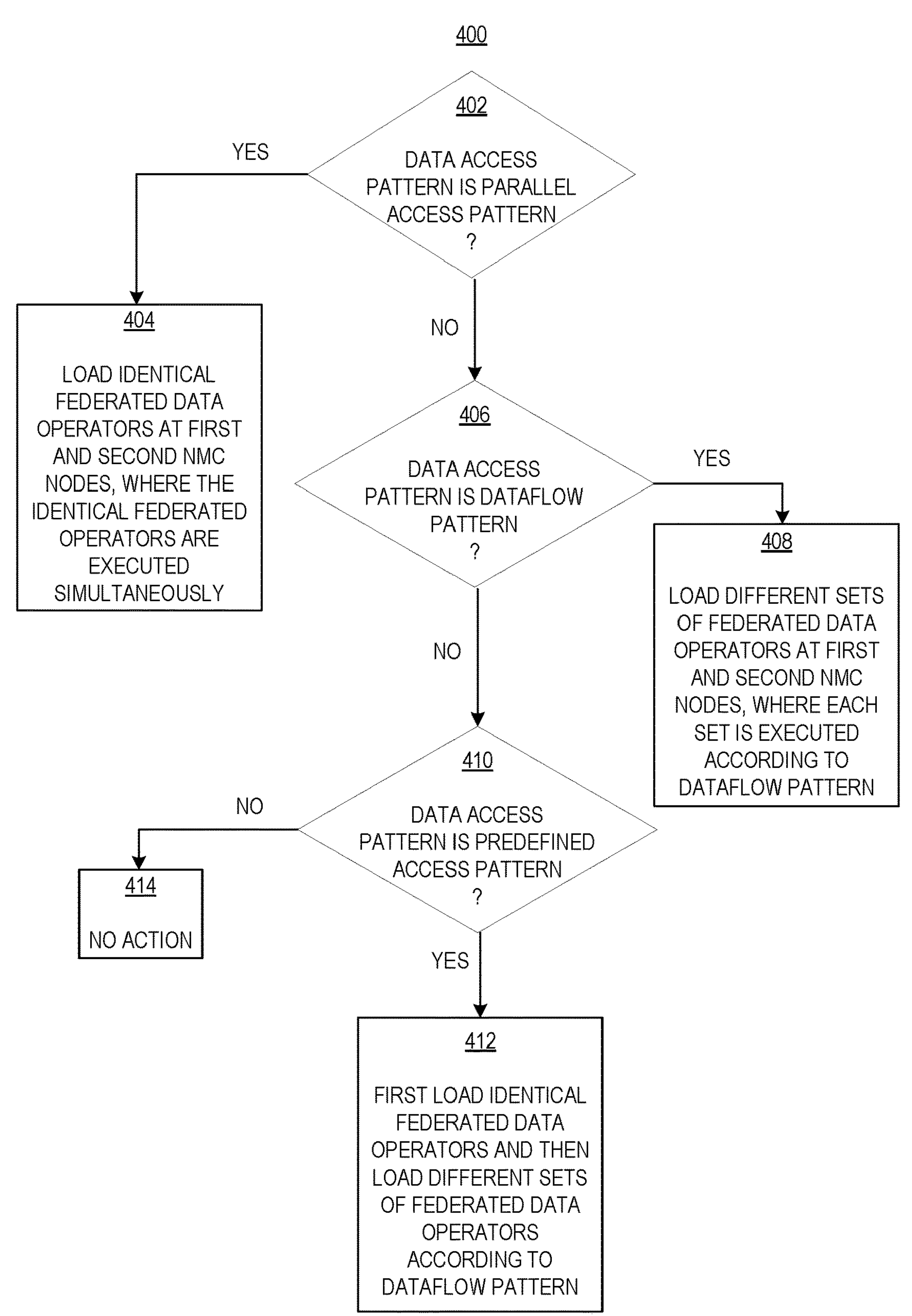
FIG. 4 is a flowchart illustrating an example method to load federated data operators across NMC nodes based on data access patterns.

FIG. 4 is a flowchart illustrating an example method 400 to load federated data operators across NMC nodes based on data access patterns. For example, when NMC node 202-1 receives a request 260 to access data stored in memory devices 242-1, 242-2, 242-3, method 400 may load federated data operators across NMC nodes 202-1, 202-2, 202-3 based on data access pattern associated with the request 260.

At block 402, method 400 includes determining if the data access pattern associated with the request 260 is a parallel access pattern. Parallel access pattern may refer to a pattern of accessing data from multiple memory devices simultaneously. For example, method 400 may determine the data access pattern based on metadata of the request 260. The metadata may specify memory addresses associated with multiple memory devices, such as memory devices 242-1, 242-2, 242-3, and that the data is to be accessed in a parallel or concurrent manner from those memory devices. If the data access pattern is a parallel access pattern (labeled as "YES" at block 402), method 400 proceeds to block 404.

At block 404, method 400 includes loading identical data operators at the multiple nodes in a federated manner. The identical federated data operators may be executed simultaneously. For example, method 400 may load data operators 251 across the NMC nodes 202-1, 202-2, 202-3 simultaneously. The data operators 251 are loaded together (i.e., in a federated manner) in the dynamic regions of the respective operator stacks of the NMC nodes 202-1, 202-2, 202-3. Further, the NMC nodes 202-1, 202-2, 202-3 may execute the data operators 251 simultaneously to perform some processing on the requested data. The NMC nodes 202-1, 202-2, 202-3 may forward the resulting data to the client application 270. Referring back to block 402, if the data access pattern is not a parallel access pattern (labeled as "NO" at block 402), then method 400 proceeds to block 406.

At block 406, method 400 includes determining if the data access pattern is a dataflow pattern. Dataflow pattern may refer to a pattern of accessing data from multiple memory devices in a particular sequence. For example, method 400 may determine that the metadata of the request 260 specifies that the data is to be accessed according to a particular pattern from the memory devices 242-1, 242-2, 242-3. If the data access pattern is a dataflow pattern (labeled as "YES" at block 406), then method 400 may proceed to block 408.

At block 408, method 400 includes loading different sets of federated data operators at the multiple NMC nodes 202-1, 202-2, 202-3 according to the dataflow pattern. For example, the dataflow pattern may indicate that the data access moves from the first NMC node 202-1 to the second NMC node 202-2 and then to the third NMC node 202-3. In such an example, the first NMC node 202-1 loads a first set of federated data operators, such as data operators 251; the second NMC node 202-2 loads a second set of federated data operators, such as data operators 252; the third NMC node 202-3 loads a third set of federated data operators, such as data operators 253. The first NMC node 202-1, the second NMC node 202-2, and the third NMC node 202-3 may execute the respective sets of federated data operators at different instances according to the dataflow. For example, the first NMC node 202-1 may execute the first set of federated data operators 251 at time T1, the second NMC node 202-2 may execute the second set of federated data operators 252 at time T2, and the third NMC node 202-3 may execute the third set of federated data operators 253 at time T3. Referring back to 406, if the data access pattern is not a dataflow pattern (labeled as "NO" at block 406), then method 400 may proceed to block 410.

At block 410, method 400 includes determining if the data access pattern is a predefined data access pattern. The predefined data access pattern may be an arbitrary pattern of data access from multiple NMC nodes. For example, method 400 may determine that the metadata of the request 260 specifies that the data is to be accessed according to a predefined pattern from the memory devices 242-1, 242-2, 242-3. The predefined data access pattern may include a combination of both parallel access and dataflow patterns. If the data access pattern is a predefined access pattern (labeled as "YES" at block 410), then method 400 may proceed to block 412.

At block 412, method 400 includes loading identical federated data operators at the multiple NMC nodes at time T1 and then loading different sets of federated data operators at the multiple NMC nodes at time T2, T3, and T4. For example, at time T1, the first, second, and third NMC nodes 202-1, 202-2, 202-3 may load identical federated data operators, such data operators 251. At time T2, the first NMC node 202-1 may load first set of federated operators, such as data operators 251. At time T3, the second NMC node 202-2 may load second set of federated data operators 252. At time T4, the third NMC node 202-3 may load third set of federated data operators 253. By loading data operators across multiple NMC nodes in a federated manner, examples reduce or eliminate multiple traversals of the same requests between client application and the NMC nodes.

Referring back to block 410, if the data access pattern is not the predefined access pattern, i.e., a combination of parallel and predefined access pattern ("NO" at block 410), then method 400 may proceed to 414.

At block 414, method 400 may not take any action, i.e., method 400 may not load federated data operators in the multiple NMC nodes.

In various examples, the method blocks 402, 406, and 410 may be performed in any order of execution and not limited to the order illustrated in FIG. 4. For example, one or both of the method blocks 406 or 410 may be performed prior to 402.

Figure 5:
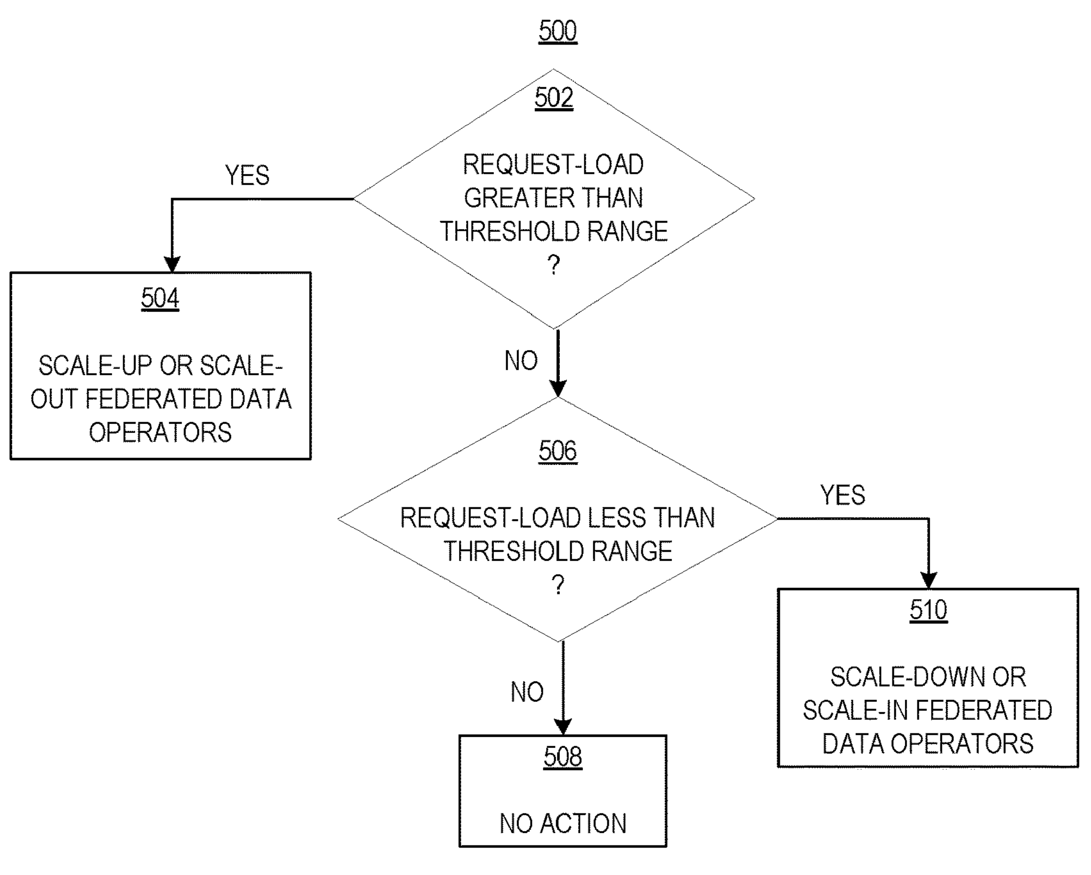
FIG. 5 is a flowchart illustrating an example method to scale federated data operators based on load associated with data operator or NMC nodes.

FIG. 5 is a flowchart illustrating an example method 500 to scale federated data operators across NMC nodes based on request-load at the NMC nodes. Request-load may refer to a number of requests received in a given period. For example, when NMC node 202-1 receives requests, such as request 260, to access data stored in memory devices 242-1, 242-2, 242-3, method 500 may monitor the request-load at the NMC node 202-1 and scale the data operators according to the request-load.

At block 502, method 500 includes determining if request-load is greater than a threshold range of values. Request-load may be associated with a data operator or an NMC node. Request-load associated with a data operator refers to the number of requests processed by that data operator in a given time period. Request-load associated with an NMC node refers to the number of requests received at the NMC node in a given time period. In some examples, method 500 includes determining the request-load associated with a particular data operator, such as data operator 251. In other examples, method 500 includes determining the request-load associated with an NMC node 202-1. If the request-load associated with the data operator 251 or an NMC node 202-1 is greater than the threshold range of values ("YES" at block 502), method 500 may proceed to block 504.

At block 504, method 500 includes scaling-up or scaling-out a data operator at an NMC node. In particular, example methods described herein may perform federated scaling policy, which includes scaling the data operators at multiple NMC nodes when scaled at one particular NMC node. For example, if the data operator 251 is scaled-up or scaled-out at NMC node 202-1, then the data operator 251 is scaled-up or scaled-out at one or more of NMC node 202-2 or NMC node 202-3. Therefore, at block 504, method 500 includes scaling-up or scaling-out data operators at multiple NMC nodes. As described earlier, scaling-out a data operator may include increasing the count of that particular data operator at the one or more NMC nodes and scaling-up the data operator may include increasing the amount of resources allocated to the particular data operator at the one or more NMC nodes.

In some examples, method 500 includes determining if sufficient resources (processing, memory, and/or network) are available prior to scaling-out or scaling-up the data operators. For example, to scale-out data operator 251, method 500 may determine if the amount of resources is greater than a predetermined threshold at one or more NMC nodes 202-1, 202-2, 202-3. The predetermined threshold may refer to an upper limit of amount of resources allocated to each data operator for loading and execution. In some examples, the predetermined threshold may be a different value for each NMC node. In other examples, the predetermined threshold may be a common value for all the NMC nodes. If the amount of resources is greater than the predetermined threshold associated with NMC node 202-1, method 500 includes scaling-out the data operator 251, i.e., adding new data operator 251 at the one or more NMC nodes 202-1, 202-2, 202-3. If the amount of resources is less than the predetermined threshold associated with NMC node 202-1, method 500 includes swapping-out data operators at the one or more NMC nodes 202-1, 202-2, 202-3. Swapping-out data operators includes replacing data operators with another data operator. For example, data operator 252 may be replaced with data operator 251. In such examples, the resources allocated to the data operator 252 may be freed and re-allocated to new data operator 251. Similarly, to scale-up data operator 251, method 500 may allocate additional resources to the data operator 251 based on availability of free resources at the one or more NMC nodes 202-1, 202-2, 202-3. Referring to block 502, if the request-load is not greater than the threshold range ("NO" at block 502), method 500 may proceed to block 506.

In this manner, examples allow scaling-out or scaling-up the data operators when NMC nodes receive a large volume of data requests from the client applications. By increasing resources allocated to a particular data operator or increasing the count of a particular data operator, the NMC nodes may efficiently process a large volume of requests received at the NMC nodes. Additionally, examples described herein allow scaling-out or scaling-up data operators across multiple NMC nodes in a federated manner, which ensures that data requests are not delayed, dropped, or remain unprocessed at one or more NMC nodes.

At block 506, method 500 includes determining if the request-load is less than (e.g., below) the threshold range of values. If the request-load is less than the threshold range of values, then method 500 may proceed to block 510.

At block 510, method 500 includes scaling-down or scaling-in the data operator at the one or more NMC nodes. As described earlier, scaling-in a data operator may include decreasing the count of that particular data operator at the one or more NMC nodes and scaling-down the data operator may include decreasing the amount of resources allocated to the particular data operator at the one or more NMC nodes. For example, to scale-in data operator 251, method 500 includes unloading (e.g., removing) the data operator 251 from the one or more NMC nodes 202-1, 202-2, 202-3. Similarly, to scale-down data operator 251, method 500 includes freeing some amount of resources allocated to the data operator 251. Referring to block 506, if the request-load is not less than the threshold range, i.e., the request-load is within the threshold range of values ("NO" at block 506), method 500 proceeds to block 508.

At block 508, method 500 does not perform any action, i.e., method 500 does not scale the data operators at the one or more NMC nodes. In such cases, method 500 does not vary the count of data operators or the amount of resources allocated those data operators at one or more NMC nodes 202-1, 202-2, 202-3.

Figure 6:
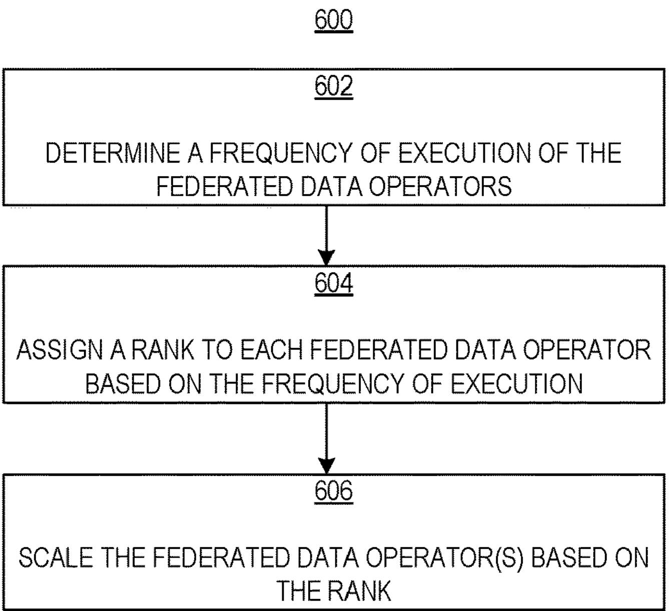
FIG. 6 is a flowchart illustrating an example method to scale a data operator based on frequency of execution of the data operator.

FIG. 6 is a flowchart illustrating an example method to scale federated data operators based on a rank assigned to each federated data operator. For example, when NMC node 202-1 receives requests, such as request 260, to access data stored in memory devices 242-1, 242-2, 242-3, method 500 may assign rank to each data operator 251, 252, 253 based on frequency of their usage and scale the data operators 251, 252, 253 according to the respective ranks.

At block 602, method 600 includes determining a frequency of execution of the federated data operators at the NMC nodes. The frequency of execution of a data operator may indicate the number of times a given NMC node loads and executes the data operator to process requests from client applications. For example, NMC node 202-1 determines the frequency of execution of each data operator 251, 252, 253 at the NMC node 202-1 to process the requests, such as request 260, received from client applications, such as client application 270. Similarly, NMC nodes 202-2 and 202-3 may also determine the frequency of execution of the respective data operators 251, 252, 253.

At block 604, method 600 includes assigning a rank to each data operator based on the frequency of execution of the data operator. Method 600 includes assigning the highest rank to a data operator with the highest frequency of execution, a second highest rank to a data operator with second highest frequency of execution, and so on. Hence, a data operator with a relatively higher rank may indicate that it is more frequently executed than another data operator with a relatively lower rank. For example, NMC node 202-1 may determine that data operator 251 has the highest frequency of execution, the data operator 252 has second highest frequency of execution, and the data operator 253 has third highest frequency of execution. Accordingly, the NMC node 202-1 may assign the highest rank to data operator 251, second highest rank to data operator 252, and third highest rank to data operator 253. Similarly, other NMC nodes, such as NMC node 202-2 and 202-3 may assign ranks to data operators based on the frequency of the execution of the data operators at the respective NMC nodes 202-2 and 202-3. The ranks for each data operator at other NMC nodes may be same or different according to the frequency of their execution at the respective NMC nodes.

At block 606, method 600 includes scaling the data operator(s) based on the rank. A data operator with the highest rank may be scaled-out or scaled-up and a data operator with a lower or lowest rank may be scaled-in or scaled-down. For example, NMC node 202-1 may scale-up or scale-out the data operator 251 (having the highest rank) and scale-down or scale-in the data operator 253 (having the lowest rank). By scaling data operators based on the rank in this manner, examples may allocate NMC node resources to data operators that are frequently used to process requests from client applications.

FIG. 7 is a flowchart illustrating another example method to scale federated data operators based on operator type of each federated data operator at an NMC node. Each individual NMC node may perform the method blocks 702, 704, and 706 of the method 700.

At block 702, method 700 includes determining, by an NMC node, an operator type for each federated data operator at the NMC node. An operator type of a data operator may indicate a resource consumption behavior of the data operator. The resource consumption behavior indicates a resource type, or an amount of resources consumed by the data operator. Examples of operator types include, but not limited to, a compute-heavy operator type, a memory-heavy operator type, a network-heavy operator type, or the like. As used herein, "compute-heavy operator type" may refer to data operators that predominantly use compute resources at the NMC node, "memory-heavy operator type" may refer to data operators that predominantly use memory resources at the NMC node, and "network-heavy operator type" may refer to data operators that predominantly use network resources at the NMC node. In some examples, method 700 may determine operator type for a data operator based on the type of resources (e.g., processing, memory, network) and the amount of resources consumed by that data operator. For example, NMC node 202-1 may determine that operator type for data operators 251, 252, 253. The data operator 251 may be compute-heavy operator, data operator 252 may be memory-heavy operator, data operator 253 may be network-heavy operator.

At block 704, method 700 includes determining, by the NMC node, whether data operators at the NMC node correspond to a predefined set of operator types. A predefined set of operator types may include operator types of data operators that have complementary resource consumption behavior, i.e., such data operators, when executed, do not lead to over-consumption of resources at an NMC node. For example, a predefined set of operator types may include compute-heavy operator type, memory-heavy operator type, and network-heavy operator type. NMC node 202-1 may determine that data operator 251, 252, 253 have operator types as compute-heavy operator, memory-heavy operator, and network-heavy operator, which corresponds to the predefined set of operator types. If the operator type determined at block 702 correspond to a predefined set of operator type ("YES" at block 706), method 700 proceeds to block 706.

At block 706, method 700 includes not taking any action, i.e., the NMC node does not perform any scaling operation of the data operators.

Referring back to block 704, if the operator types determined at block 702 do not correspond to predefined set of data operators, then method proceeds to block 708. For example, at block 702, method 700 determines that the operator type of data operator 251 is compute-heavy operator, data operator 252 is memory-heavy operator, data operator 253 is network-heavy operator. Method 700 may determine, at block 704, that the operator types do not correspond to the predefined set of operators, and proceeds to block 708.

At block 708, method 700 includes scaling, by the NMC node, one or more of the data operators at the NMC node. For example, NMC node 202-1 may scale-down or scale-in data operator 253 (compute-heavy operator), which does not correspond to a network heavy-operator type of predefined set of operator types and re-allocate NMC node resources to another data operator, such as data operator 251 and 252. By scaling data operators that have complementary resource consumption behavior in this manner, examples may effectively utilize resources at NMC node(s) and avoid or reduce over-consumption of one particular resource at the NMC node(s).

FIG. 8 is a block diagram illustrating a computing device 800 that can scale data operators together with data operators offloaded at other communicatively coupled NMC nodes. The computing device 800 may be, for example, an NMC node, a controller, or any other similar computing component capable of processing data. In the example implementation of FIG. 8, the computing device 800 includes a processing resource 802, and machine-readable storage medium 804.

Processing resource 802 may be one or more central processing units (CPUs), semiconductor-based microprocessors, and/or other hardware devices suitable for retrieval and execution of instructions stored in machine-readable storage medium 804. Processing resource 802 may fetch, decode, and execute instructions, such as instructions 806-810. As an alternative or in addition to retrieving and executing instructions, processing resource 804 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810.

Processing resource 802 may execute instruction 806 to receive a user request from a client device to access data stored in memory device of a network-attached memory system. As described above, a client device (e.g., client device 104 of FIG. 1) may submit a request through a client application (e.g., client application 106 of FIG. 1).

Processing resource 802 may execute instruction 808 to load federated data operators based on one or more of request characteristics or operator characteristics of the federated data operators. The data operators are managed together with other data operators deployed at other computing devices (e.g., NMC nodes) communicatively coupled to the device 800.

In some examples, the request characteristics may include one or more of request-load, a type of applications, or a type of data requested. For example, the processing resource 802 may monitor the request-load (i.e., number of requests received) and load relevant data operators to ensure the request-load is managed efficiently. The processing resource 802 may determine the type of application requesting data (e.g., via request metadata) and load data operators that may be related to the application. For example, the processing resource 802 may identify data operator that was previously used for processing requests from a given application and load that data operator. The processing resource 802 may load data operators according to the type of data requested. If the requested data is private or sensitive, the processing resource 802 may load encryption data operator to encrypt the requested data before transmitting to the application, for example.

In some examples, the operator characteristics may include one or more of data operators availability or particular data operator(s) specified in the request. For example, the processing resource 802 may identify data operator specified in the request (e.g., request metadata) and load the data operator to process the request.

Processing resource 802 may execute instruction 810 to scale the federated data operators based on performance metrics associated with the federated data operators in correlation with client application performance.

Although the present disclosure has been described in detail, it should be understood that various changes, substitutions, and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A method comprising:

receiving, at a first near-memory compute (NMC) node attached to a first memory device of a network-attached memory system, a request to access data stored in the network-attached memory system from a client application, wherein the first NMC node is communicatively coupled to a second NMC node attached to a second memory device of the network-attached memory system;

loading federated data operators at the first NMC node and the second NMC node, wherein the federated data operators are functions executed based on a data access pattern associated with the request; and scaling the federated data operators based on performance metrics for the federated data operators in correlation with client application performance, wherein scaling the federated data operators based on performance metrics for the federated data operators in correlation with client application performance comprises:

determining performance metrics for the federated data operators;

determining a performance metric for the client application from which the request was received;

determining a correlation between the performance metrics for the federated data operators and the performance metric for the client application, the correlation being indicative of a relationship between the performance metrics for the federated data operators and the performance metric for the client application; and scaling the federated data operators according to the correlation between the performance metrics for the federated data operators and the performance metric for the client application.

2. The method of claim 1, wherein the data access pattern is one or more of a parallel access pattern, dataflow pattern, or a predefined access pattern.

3. The method of claim 2, wherein loading the federated data operators at the first NMC node and the second NMC node comprises:

determining that the data access pattern is the parallel access pattern; and loading identical federated data operators at the first NMC node and the second NMC node, wherein the identical federated data operators are executed simultaneously at the first NMC node and the second NMC node.

4. The method of claim 2, wherein loading the federated data operators at the first NMC node and the second NMC node comprises:

determining that the data access pattern is the dataflow pattern; and loading a first set of federated data operators at the first NMC node and a second set of federated data operators at the second NMC node, wherein the first set of federated data operators and the second set of federated data operators are executed at different periods.

5. The method of claim 2, wherein loading the federated data operators at the first NMC node and the second NMC node comprises:

determining that the data access pattern is a predefined access pattern, wherein the predefined access pattern is a combination of the parallel access pattern and the dataflow pattern;

loading identical federated data operators at the first NMC node and the second NMC node, wherein the identical federated data operators are executed simultaneously at the first NMC node and the second NMC node at a first period; and loading a first set of federated data operators at the first NMC node and a second set of federated data operators at the second NMC node, wherein the first set of federated data operators is executed at a second period and the second set of federated data operators is executed at a third period.

6. The method of claim 1, wherein scaling the federated data operators comprises:

responsive to scaling the federated data operators at the first NMC node, scaling the federated data operators at the second NMC node.

7. The method of claim 1, wherein scaling the federated data operators comprises:

responsive to determining that a request-load at the first NMC node is greater than a predetermined threshold range, scaling the federated data operators at the first NMC node, wherein the scaling includes one or more of increasing the federated data operators at the first NMC node or increasing resources allocated to the federated data operators at the first NMC node.

8. The method of claim 1, wherein scaling the federated data operators comprises:

determining a request-load at the first NMC node and the second NMC node; and scaling the federated data operators at the first NMC node and the second NMC node based on the request-load at the first NMC node and the second NMC node.

9. The method of claim 1, wherein scaling the federated data operators comprises:

for each of the federated data operators, assigning a rank indicative of a frequency of execution of the federated data operator; and scaling the federated data operators based on the rank assigned to the federated data operators.

10. The method of claim 1, wherein the performance metrics are measured at each of the federated data operators, and wherein the performance metrics are based on one or more of data transfer, latency, bandwidth, or energy savings.

11. The method of claim 10, further comprising:

swapping a first set of federated data operators with a second set of federated data operators by reallocating resources of the first set of federated data operators to the second set of federated data operators.

12. A non-transitory machine-readable medium storing instructions executable by a processing resource, the instructions comprising instructions to:

receive, at a first near-memory compute (NMC) node attached to a first memory device of a network-attached memory system, a request to access data stored in the network-attached memory system from a client application, wherein the first NMC node is communicatively coupled to a second NMC node attached to a second memory device of the network-attached memory system;

determine a data access pattern associated with the request;

load, according to the data access pattern associated with the request, federated data operators at the first NMC node and the second NMC node, wherein the federated data operators are functions executed based on the data access pattern associated with the request; and scale the federated data operators based on performance metrics for the federated data operators in correlation with client application performance, wherein scaling the federated data operators based on performance metrics for the federated data operators in correlation with client application performance comprises:

determining performance metrics for the federated data operators;

determining a performance metric for the client application from which the request was received;

determining a correlation between the performance metrics for the federated data operators and the performance metric for the client application, the correlation being indicative of a relationship between the performance metrics for the federated data operators and the performance metric for the client application; and scaling the federated data operators according to the correlation between the performance metrics for the federated data operators and the performance metric for the client application.

13. The non-transitory machine-readable medium of claim 12, wherein the instructions to scale the federated data operators further comprising instructions to:

responsive to determining that a request-load in a period is greater than a threshold and that resource consumption amount is in a threshold range:

identify a first federated data operator from the federated data operators at the first NMC node; and add a new first federated data operator at the first NMC node by swapping resources allocated to a second federated data operator.

14. The non-transitory machine-readable medium of claim 12, wherein the instructions to scale the federated data operators further comprising instructions to:

responsive to determining that a request-load in a period is greater than a threshold and that resource consumption amount is in a threshold range:

allocate additional resources to a first federated data operator at the first NMC node by swapping out resources allocated to a second federated data operator at the first NMC node.

15. The non-transitory machine-readable medium of claim 12, wherein the instructions to scale the federated data operators further comprising instructions to:

create a third federated data operator by combining a first federated data operator and a second federated data operator.

16. The non-transitory machine-readable medium of claim 12, wherein the instructions to scale the federated data operators further comprising instructions to:

unload a first federated data operator from the first NMC node; and load the first federated data operator at a client device hosting the client application.

17. The non-transitory machine-readable medium of claim 12, wherein the instructions to scale the federated data operators further comprising instructions to:

determine that a first federated data operator is associated with a first operator type and that a second federated data operator is associated with a second operator type; and responsive to determining that the first operator type and the second operator type do not correspond to a predefined set of operator types, scaling one of the first federated data operator or the second federated data operator.

18. A device comprising:

a processing resource; and a machine-readable storage medium comprising instructions executable by the processing resource to:

receive a request to access data stored in a network-attached memory system from a client application;

load federated data operators based on one or more of request characteristics of the request or operator characteristics of the federated data operators, wherein the federated data operators are deployed across multiple near memory compute (NMC) nodes communicatively coupled to the device; and scale the federated data operators based on performance metrics for the federated data operators in correlation with client application performance, wherein scaling the federated data operators based on performance metrics for the federated data operators in correlation with client application performance comprises:

determining performance metrics for the federated data operators;

determining a performance metric for the client application from which the request was received;

determining a correlation between the performance metrics for the federated data operators and the performance metric for the client application, the correlation being indicative of a relationship between the performance metrics for the federated data operators and the performance metric for the client application; and scaling the federated data operators according to the correlation between the performance metrics for the federated data operators and the performance metric for the client application.

19. The device of claim 18, wherein the request characteristics of the requests comprises one or more of: a number of the requests, a type of the client application, or a type of the data requested.

20. The device of claim 18, wherein the operator characteristics of the federated data operators comprises one or more of data operator availability or data operator specified in the requests.

* * * * *